April 26, 1932.  J. BOROVEC ET AL  1,855,333

GOVERNOR FOR VARIABLE SPEED GENERATORS

Filed Sept. 28, 1927

Witness:
William P. Kilroy

Inventors
Joseph Borovec
Renfrew H. Kuehmsted
By Charles S. Neilson
Atty

Patented Apr. 26, 1932

1,855,333

UNITED STATES PATENT OFFICE

JOSEPH BOROVEC, OF BERWYN, AND RENFREW H. KUEHMSTED, OF HIGHLAND PARK, ILLINOIS, ASSIGNORS TO THOMPSON & JAMESON CORPORATION, OF CHICAGO, ILLINOIS, A CORPORATION OF ILLINOIS

GOVERNOR FOR VARIABLE SPEED GENERATORS

Application filed September 28, 1927. Serial No. 222,430.

This invention relates to governors for variable speed generators and has for its object the maintenance of a constant voltage from the generator irrespective of the speed at which it is operated.

With the above and other objects in view, as will be apparent, this invention consists in the construction, combination and arrangement of parts all as hereinafter more fully described, claimed and illustrated in the accompanying drawings, wherein:

Figure 1:
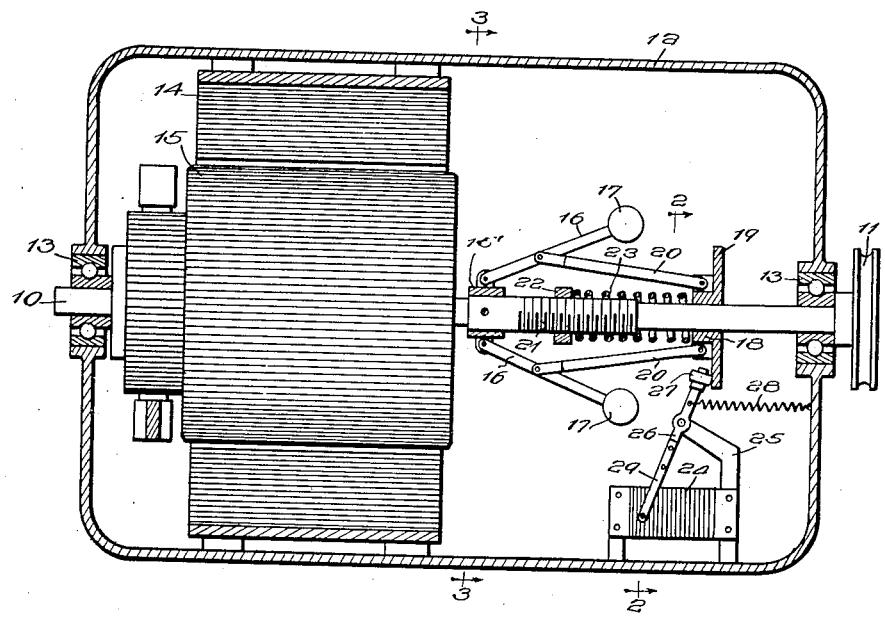
Fig. 1 is a longitudinal section through a generator illustrating the governor forming the subject matter of the present invention cooperating therewith.
Figure 2:
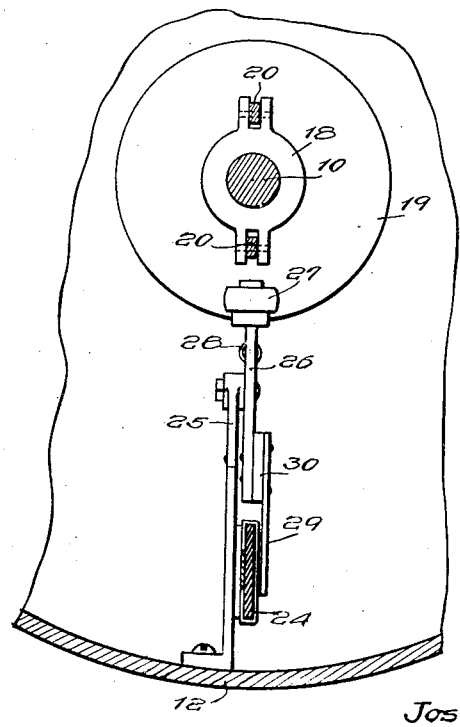
Fig. 2 is an enlarged vertical transverse section taken along line 2—2 of Fig. 1 through the governor.

While the present invention is of general application and use in connection with variable speed generators, it is particularly applicable to generators operated from internal combustion engines where the speed of the engine constantly varies with a resulting variation in the speed of the generator. The compound winding of the generator maintains a constant current flow regardless of the speed of the engine or load condition. On the other hand the speed of the generator determines the voltage and therefore it is desirable to maintain a constant voltage irrespective of the speed of the generator.

It is also contemplated by the present invention to provide a control of the voltage produced by the generator and at the same time to provide a means whereby the field of a motor operated from the generator may be built up or excited prior to its operation so that it will have a greater torque.

Reference being had more particularly to the drawings, 10 designates a generator shaft having a pulley or gear 11 at one end for the operation thereof from an internal combustion engine or other suitable source of power. This shaft 10 is surrounded by a casing 12 in which the shaft rotates by means of the suitable bearings 13; the shaft projecting from each end of the casing 12. At one end of the casing 12 is the field 14 and armature 15 of the generator; these elements occupying substantially one-half of the casing. Keyed to the shaft 10 adjoining the armature 15 is a collar 15' which rotates with the shaft. This collar carries the diametrically positioned governor arms 16 having the governor weights 17 at their free ends. A sleeve 18 is slidably mounted on the shaft 10 between the collar 15 and the outer end of the casing 12, said sleeve having an outstanding flange plate 19. The governor arms 16 are connected to the sleeve 18 by means of the links 20. Therefore, as the shaft 10 rotates, its speed of rotation will determine the angular position of the arms 16 with respect to the shaft 10, and will also determine the position of the sleeve 18 on the shaft. As is well known, the rotation of the shaft tends to throw the arms and weights 16 and 17, respectively, away from the shaft 10 and by that action draw the sleeve 18 toward the collar 15'.

In order to regulate this action on the part of the governor arms and weights, the shaft 10 between the sleeve 18 and the collar 15' is threaded as at 21 and has a nut 22 mounted for adjustment thereon. A coil spring 23 is interposed between the nut 22 and the sleeve 18 and by its action tends to force the sleeve 18 away from the collar 15'. The movement of the spring toward the collar 15' by virtue of the outward movement of the governor arms and weights 16 and 17, is against the tension of the spring 23 and consequently the adjustment of the nut 22 on the shaft 10, thereby regulating the tension of the spring 23, will determine the speed at which the shaft 10 must operate in order to move the sleeve 18 against the action of said spring.

Thus it will be seen that the greater the speed of the shaft 10 the nearer the sleeve 18 and its disk 19 will be positioned on said shaft to the collar 15' and reversely the slower the speed of the shaft 10, the farther removed from the collar 15' will be the sleeve 18 under the influence of the spring 23.

In order to control the voltage of the generator from the speed of the shaft 10, a resistance 24 is mounted in the casing 12 below the shaft 10 and adjoining the disk 19. This resistance is in the field of the generator as will hereinafter be more fully described.

A bracket 25 extends from the frame carrying the resistance 24 and is bent at its outer end so that its terminal is positioned approximately above the center of the resistance. Pivotally mounted in the end of the bracket 25 is an arm 26 which extends upon each side of the bracket 25. The upper end of the arm 26 has a friction roller 27 mounted thereon for cooperation with the face of the friction disk 19. This friction roller is held in contact with the face of the disk 19 by means of the retractile coil spring 28 interposed between the arm 26 just below the roller 27 and the end of the housing 12. The end of the arm 26 opposed to the roller 27 carries a contact member 29 which is separated from the body of the arm 26 by the insulating block 30.

From the foregoing it is manifest that as the speed of the shaft 10 increases, the sleeve 18, together with the disk 19, move on the shaft 10 toward the collar 15' and against the tension of the spring 23. This action causes the plate 19 to exert a pressure on the roller 27 and thereby move the arm 26 against the tension of the spring 28. As the arm 26 thus moves against the tension of the spring 28 the contact member 29 thereof moves along the resistance 24, increasing the resistance in the field 14 of the generator. In this manner the greater the speed of the shaft 10, the greater the resistance in the field and by this means the voltage from the generator is maintained constant.

From the foregoing it is manifest that this invention provides a governor for a variable speed generator which will maintain a constant voltage from the generator irrespective of the speed thereof.

Claims:

1. The combination with a variable speed generator, including a generator shaft, of a resistance cooperating with the field thereof to determine the voltage from the generator, an arm for regulating said resistance, a friction plate carried by said shaft for contact with the arm aforesaid to control its position, a centrifugal governor operated by said shaft to control the position of said plate on said shaft and through it the position of the arm aforesaid a housing for said generator, said shaft being journalled at its ends in said housing, said resistance being mounted within said housing to provide a unitary enclosure for said elements.

2. The combination with a variable speed generator, including a housing encasing said generator, of a generator shaft having a portion of its length threaded and having its ends journaled in said housing, a resistance cooperating with the field of the generator to determine the voltage therefrom, an arm for regulating said resistance, a friction plate slidably mounted on said shaft for contact with and operation of said arm, a collar fixed to said shaft for rotation therewith, a governor interposed between said control and said friction plate whereby the speed of the shaft determines the position of the plate upon said shaft and thereby the adjustment of said resistance regulating arm, a nut mounted upon the threaded portion of said shaft, and a spring interposed between said nut and said plate.

RENFREW H. KUEHMSTED.
JOS. BOROVEC.